(12) United States Patent  (10) Patent No.: US 7,921,121 B2
Muller  (45) Date of Patent: *Apr. 5, 2011

(54) APPARATUS FOR REPRESENTING AN INTEREST PRIORITY OF AN OBJECT TO A USER BASED ON PERSONAL HISTORIES OR SOCIAL CONTEXT

(75) Inventor: Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 400 days.

This patent is subject to a terminal disclaimer.

(21) Appl. No.: 12/136,105

(22) Filed: Jun. 10, 2008

(65) Prior Publication Data
US 2008/0313138 A1 Dec. 18, 2008

Related U.S. Application Data

(63) Continuation of application No. 10/753,689, filed on Jan. 8, 2004, now Pat. No. 7,415,465.

(51) Int. Cl.
G06F 17/30 (2006.01)

(52) U.S. Cl. .......... 707/749; 707/999.002; 707/999.007; 707/723; 707/748; 707/758

(58) Field of Classification Search ........... 707/999.002, 707/999.007, 723, 727, 748, 758, 749
See application file for complete search history.

(56) References Cited

U.S. PATENT DOCUMENTS
2005/0154694 A1 * 7/2005 Muller .............................. 707/1
* cited by examiner Primary Examiner — Apu M Mofiz
Assistant Examiner — Monica M Pyo
(74) Attorney, Agent, or Firm — David A. Dagg

(57) ABSTRACT

A method and apparatus assigns a quantative variable to each object (or set of objects) in a collection available to a user. The quantative variable is referred to as the Interest Priority Value (IPV). The IPV defines a range of states of the object, between 'accessed' and 'unaccessed', and is calculated based on one or more attributes of the object. A object with the highest IPV is the most 'unaccessed,' and the object with the lowest IPV is the least 'unaccessed.' The IPV may be used in a visual representation of the collection of objects, thereby permitting a user to readily identify and obtain those objects of greatest interest to the particular user.

31 Claims, 11 Drawing Sheets

APPARATUS FOR REPRESENTING AN INTEREST PRIORITY OF AN OBJECT TO A USER BASED ON PERSONAL HISTORIES OR SOCIAL CONTEXT

CROSS-REFERENCE TO RELATED APPLICATIONS

The present application is a Continuation under 35 U.S.C. 120 of commonly assigned prior U.S. application Ser. No. 10/753,689, filed Jan. 8, 2004 now U.S. Pat. No. 7,415,465 in the name of Michael Muller, now allowed.

FIELD OF THE INVENTION

This invention relates generally to the field of object retrieval and more particularly to a method and apparatus for identifying an object that is of interest to a user.

BACKGROUND OF THE INVENTION

Many professions require that the individuals who engage in the profession maintain an up to date knowledge of different aspects of their practice. For example, investment bankers may need to identify current market trends and fund performance, technical researchers need access to the most current research in their field of expertise, and engineering development teams may need access to technical specifications and performance analyses. Each individual obtains information from a wide variety of sources including email, news services, technical forums and web-browsing, among others. The information may accumulate on a daily basis, and it is often difficult for the professional to sort through the accumulated information and prioritize the reading of the information. While various services include mechanisms for indicating to the user that he or she has already read a document, little else has been done to assist the user's document selection process. It would be desirable to identify a method which would assist an individual in identifying which documents in a collection are the highest priority documents given the individuals personal knowledge needs.

Further, users often choose the documents that they read through knowledge of what other users have read. In some cases, a group or team of users may wish to distribute their reading so as to provide broad coverage of a large number of documents. In yet other cases, one user may wish to read what other, influential users have read, so as to be able to anticipate questions from those other, influential users. In these senses, reading takes place in a social context. It is desirable to assist users in making reading choices based on these social factors.

SUMMARY OF THE INVENTION

According to one aspect of the invention, a method of sorting objects includes the steps of calculating an interest priority value for each object in a collection of objects responsive to at least one attribute of the associated object, where each interest priority value represents a relative importance of the corresponding document to an accessing individual compared to other documents in the collection. The method also includes the step of storing each interest priority value in a database. With such an arrangement, the interest priority values may be used to identify one or more objects in the collection that are important objects for access by the user.

According to another aspect of the invention, a data structure stored on a computer-readable medium in a computer processing system is described, the data structure including an entry for each object in a collection of objects, each entry storing an interest priority value for each associated object in the collection responsive to at least one attribute of the associated object, where each interest priority value indicates a relative importance of the corresponding object to an accessing individual compared to other objects in the collection.

According to a further aspect of the invention, an apparatus for calculating an interest priority value for at least one object in a collection of objects accessed by a user includes an attribute database for storing an attribute indicator for each object in the collection and interest priority calculation logic, coupled to the database, for assigning an interest priority value to the at least one object in response data in the attribute database for all of the objects in the collection.

According to a further aspect of the invention, an apparatus for indicating that at least one object in a collection of objects is of interest to a user includes an attribute database for storing an attribute indicator for each object in the collection; interest priority calculation logic, coupled to the database, for assigning an interest priority value to the at least one object in response to data in the attribute database for all of the objects in the collection; and a display, coupled to the interest priority calculation logic, for providing an icon associated with one or more of the objects in the collection, and having a visual attribute that is set according to the interest priority value of the one or more objects.

A computer system for use by a user, the computer system having a graphical display device, where the user is capable of accessing a collection of objects, the computer system comprising an icon, stored in a memory of the computer system, the icon associated with one or more of the objects in the collection, and having a visual attribute that is controlled according to an attribute of the one or more objects relative to other objects in the collection, wherein the visual attribute indicates an attractiveness of the one or more objects to the user.

DETAILED DESCRIPTION

According to one aspect of the invention, the prior art difficulties of determining which objects in a collection are of the most interest to a user seeking to expand his or her knowledge base are overcome by the present invention. The collection of objects may include a variety of different data entities, including documents, modules of program code, images, multimedia clips, database records, and yet other types of sharable objects. For exemplary purposes only, the below description illustrates the use of the present invention with document objects.

A method and apparatus will now be described wherein one or more objects, or documents, is assigned a quantitative variable, referred to hereinafter as the Interest Priority Value (IPV). The IPV in essence defines a range of states of the document, between 'read' and 'unread'. For the sake of this application, it will be assumed that a document with the highest IPV is the most 'unread,' and the document with the lowest IPV is the least 'unread.' Other types of access, in addition to reading the object, are also embodied herein, including hearing (for audio object) or viewing (of video/visual objects), and thus the concepts of 'unread' or 'read' may be viewed generically as 'accessed' and 'unaccessed.' In one embodiment, the IPV may be used in a visual representation of the collection of documents, thereby permitting a user to readily identify and obtain those documents of greatest interest to the particular user.

As will be described, according to the present invention, documents can have varying degrees of 'unreadness,' based on a variety of different attributes of the document. The values of the attributes are specific to the particular user, and thus the IPV for a document will vary from user to user. In addition, each user may choose to use different attributes in the calculation of IPVs for their documents. The below description will describe individual attribute types, which can be used either in isolation or in combination depending upon the particular desires of the user.

Figure 1:
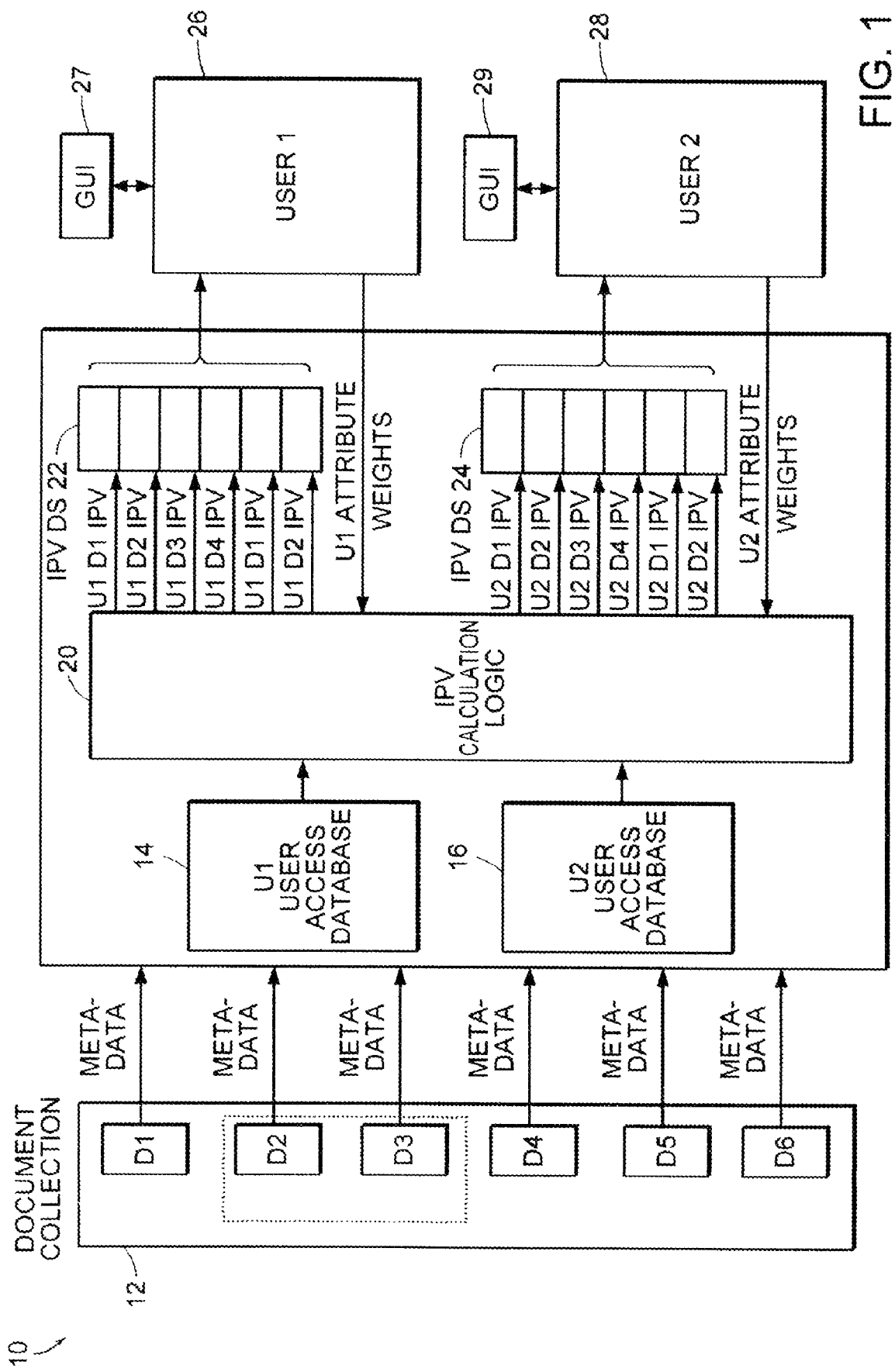
FIG. 1 illustrates one embodiment of an object interest indication system according to the present invention, wherein the object interest is set according to temporal input.

Referring now to FIG. 1, one embodiment of a document interest indication system 10 is shown coupled to a collection of documents 12. The system 10 receives various meta-data for each document including information on when the document was last accessed, and by whom. In the embodiment of FIG. 1, system 10 includes, for each user, a user access database, such as user access databases 14 and 16. The user access databases 14 and 16 store, for each document available to the user, information regarding the user's access history for the document. In one embodiment, the information could include a read indicator, set when the user reads the document, and a time stamp also set when the user reads the document, although other methods of representing this information may alternatively be used. The user access databases 14 and 16 are accessed by Interest Priority Value (IPV) logic 20, examines the access history information for each document for each user, and calculates a Interest Priority Value (IPV) for each document. In one embodiment, the IPVs are assigned to documents in decreasing order from those unread documents that have been in the collection the longest to those unread documents that have recently entered the collection. According to one aspect of the invention, the temporal attribute based on length of time that the unread document has remained in the collection is referred to as the 'Available Time' attribute. As shown in FIG. 1, when IPVs are calculated, they are transferred to an IPV data structure 22 or 24, which are accessible by the individual users.

The temporal attribute information provided by the user access databases may also be used to set the IPV in another manner. For example, if it has been a long time since the user has read a document, the 'unread' state of the document may increase from 'read' to some value in the IPV range. The amount of time that would cause this to happen is user dependent, as some professionals have a greater ability to retain knowledge than others. Thus, the user access databases may be used to calculate an Elapsed Time attribute (E) since the document was read. This attribute may be used in calculating the overall IPV for the document.

Figure 2:
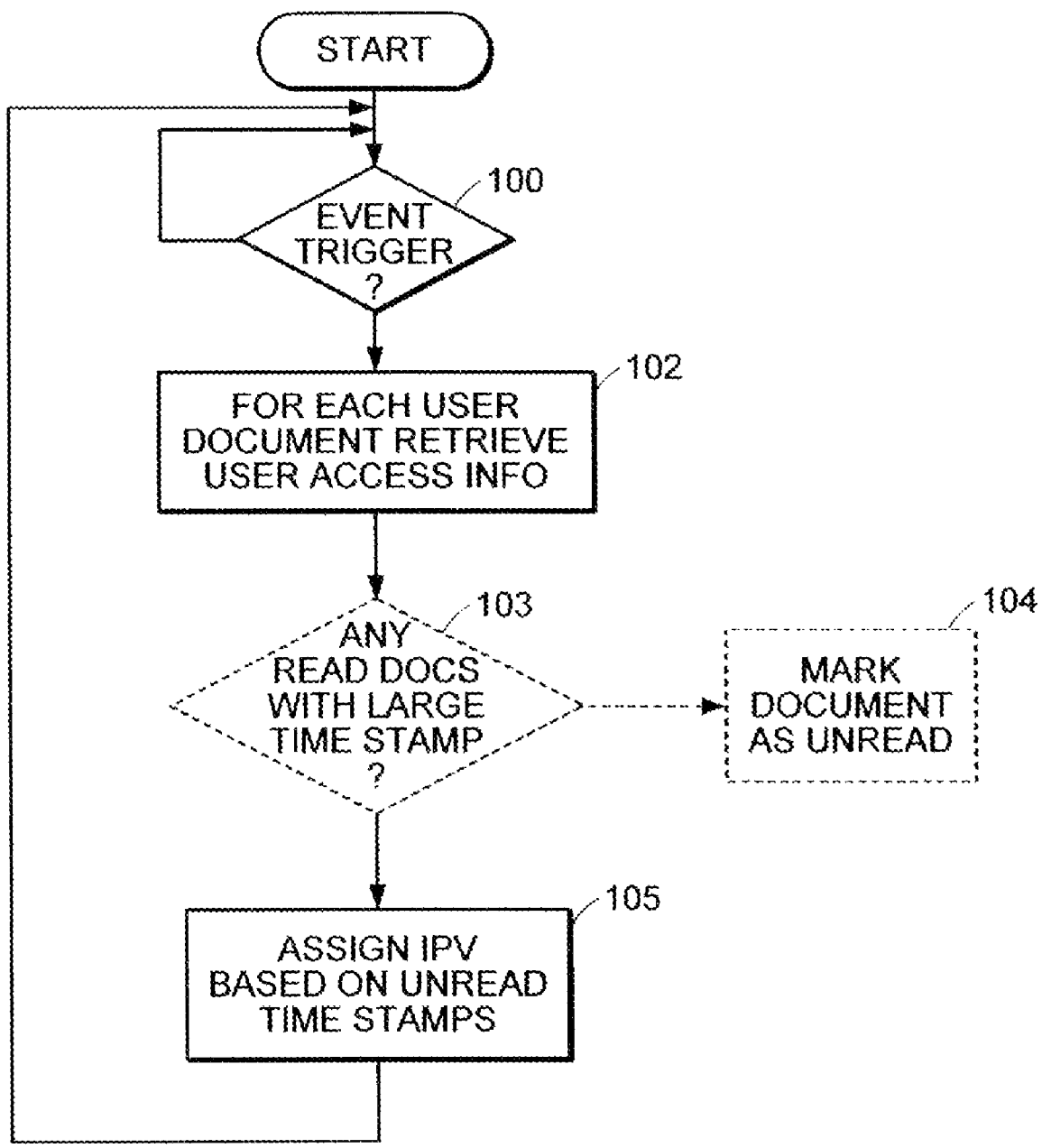
FIG. 2 is a flow diagram illustrating an exemplary process by which object interest priority values may be set using the system of FIG. 1.

Referring now to FIG. 2, a flow diagram illustrating steps that may be performed to calculate IPVs for documents based on the temporal information in the user access database will now be described. At step 100, the system awaits an event trigger, which causes the update of the IPVs for one or more documents. The event that triggers IPV update could be any event, including but not limited to an access of any document in the collection by any user having access to the document, a time out of a pre-determined time period, or a change in group membership of users who have access to any of the documents in the collection. The exact event that is used to trigger the update is not a limitation of the present invention.

At step 102, for each document that is in the user collection, the system 10 IPV calculation logic 20 retrieves access information from the user access database. As stated above, in one embodiment the access information includes a time stamp, and the Available Time attribute (A) is calculated for each document relative to the retrieved time stamps of the documents. In another embodiment, (indicated by dashed steps 103 and 104) the time stamps are used calculate the Elapsed time attribute (E) for each read document. If the value of E exceeds a predetermined threshold, document becomes unread. At step 105, a range of IPVs are assigned to the unread documents, (with read documents being assigned the lowest possible IPV).

Thus FIGS. 1 and 2 illustrate a method and apparatus by which temporal information may be used to defined an Available Time and Elapsed Time attribute, each of which may be used together or separately to set an IPV for a given document. The IPVs are then stored in an IPV data structure, and may be used to highlight to documents of most interest to the particular user.

Figure 3:
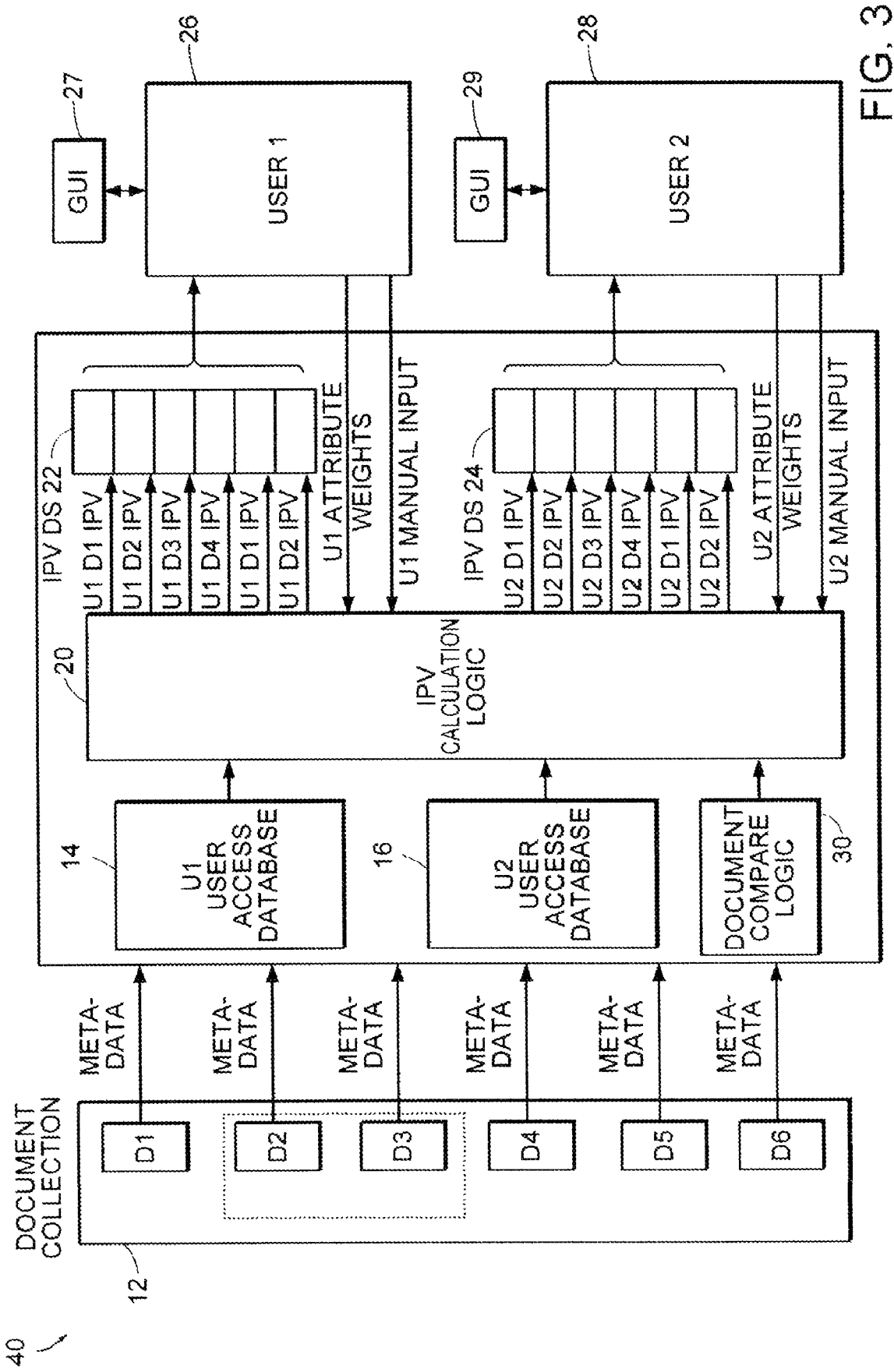
FIG. 3 illustrates a second embodiment of an object interest indication system of the present invention, wherein object interest is determined according to inter-object similarity.

Referring now to FIG. 3, an alternative embodiment of a document interest indication system 40 is shown to include document compare logic 30. The document comparison logic 30 may be used to compare the contents of a particular document with other documents in the collection. The comparison can be performed using a variety of methods known to those of skill the art, including but not limited to text analysis, word count, cluster word count et. al. The method used to determine document similarity is not a limitation of the present invention. However, typical document comparison tools are capable of providing a numerical indicator of how closely the documents match. This indicator is used in the present invention to identify two different similarity attributes which may be used in the IPV calculation. The first similarity attribute is referred to as Collection match (C), and is used to indicate how similar a document is to other documents in the collection. In calculation of the Collection attribute, each unread document is compared for content match with every other document in the user's collection. The more similar the document is, the less unread the document is, since there is less novel content in the document.

The second similarity attribute is referred to as an Ego-Centric Collection attribute (eC), and indicates how similar a given document is to other documents that the user has already read. If the eC indicates an extremely high level of similarity with material already read by the user, the unreadness factor of the document may be decreased, so that the user can go on to other documents that are more likely to provide new information. In an alternative embodiment, the user may wish to read exhaustively on a single topic. In this case, if the document is similar to a document already read by the user, this may indicate that the user has a great interest in this subject matter, and thus the unreadness of the document may be increased. The level of similarity which would cause the user to determine that the document was largely redundant may be a variable that is programmable by the user.

Figure 4:
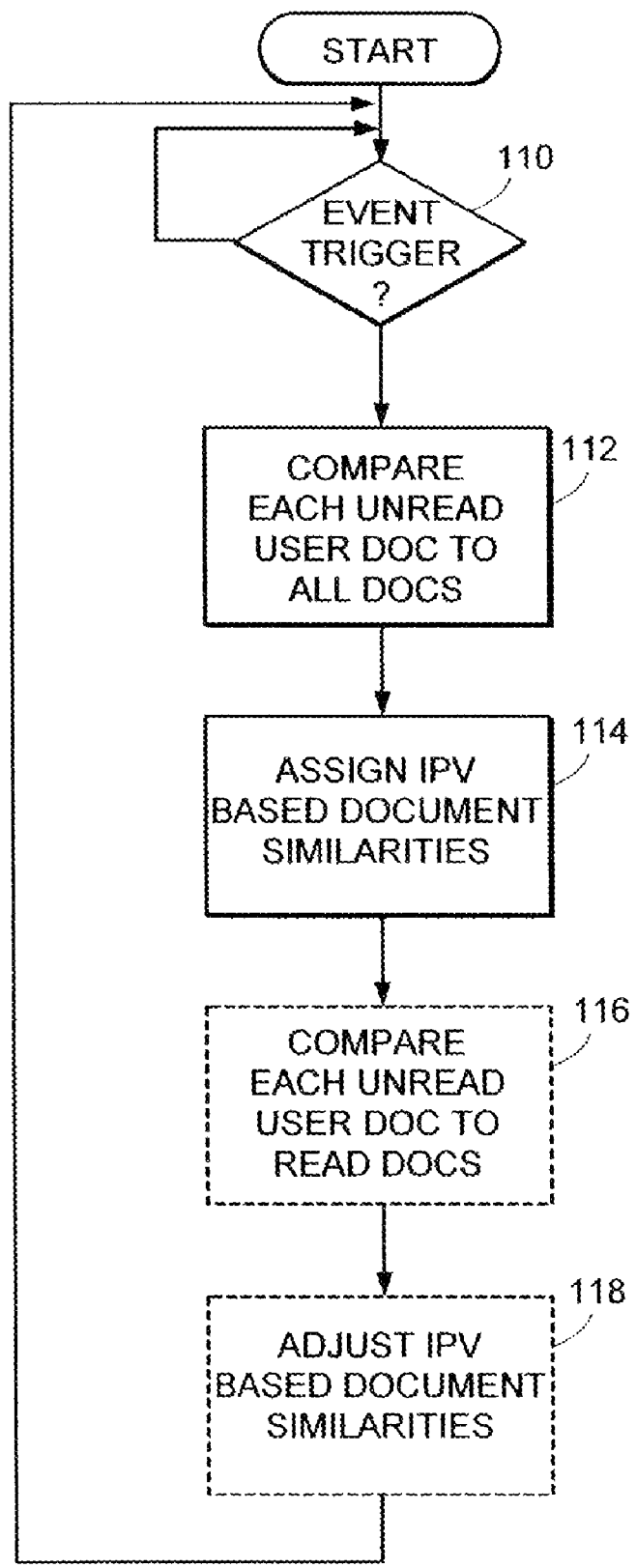
FIG. 4 is a flow diagram illustrating an exemplary process by which object interest priority values may be set using the system of FIG. 3.

Referring now to FIG. 4, and exemplary flow chart provided for illustrating the user of the comparison logic 30 in calculating the IPV will now be described. At step 110, the system awaits an event trigger, which causes the recalculation of one or more IPVs. At step 112, the document is compared against other documents in the user's collection to calculate the Collection match attribute. At step 114, the IPV may be assigned based on the Collection match attribute. In an alternative embodiment (illustrated by dashed steps 116 and 118), each unread document is also compared against each document that has been read by the user. If it is determined that there are similarities between documents previously read by the user, and the document, the IPV is updated accordingly.

Figure 5:
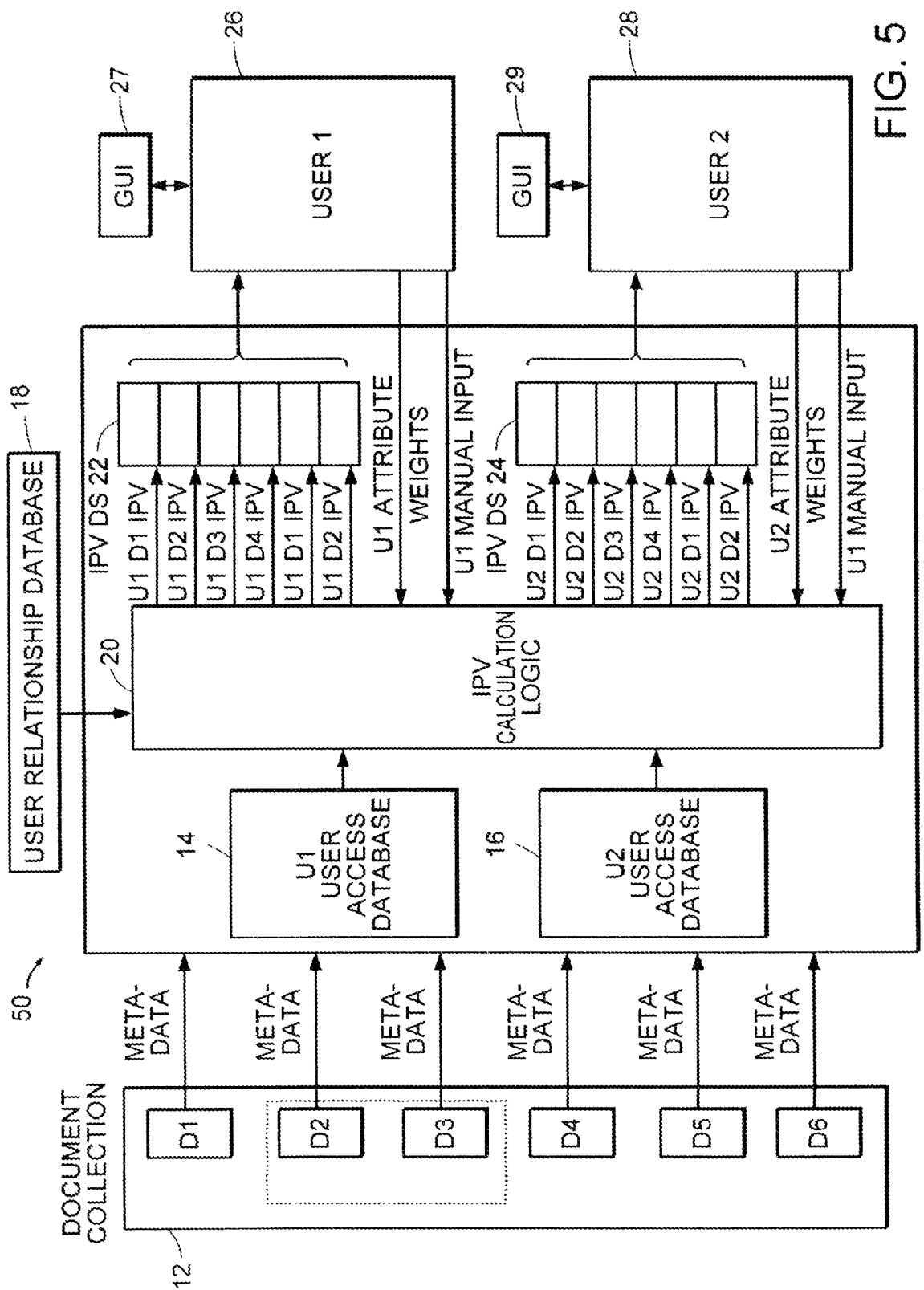
FIG. 5 illustrates a second embodiment of an object interest indication system of the present invention, wherein object interest is determined according to inter-object similarity.

Referring now to FIG. 5, a third embodiment is shown of an interest indication system 50, including a user relationship database 18. The user relationship database 18 is used to set a Relationship attribute (R) for each document. The relationship database 18 identifies certain individuals that have a relationship to the user, including, for example, authors that are of interest to the user, superiors to the users, co-workers of the user, or anyone indicated by the user as of interest. When a document is written by one of the individuals in the relationship database, the 'unreadness' value of the document increases. Thus, the relationship factor permits a user to flag content that is of interest to the user based on the source of the document.

Figure 6:
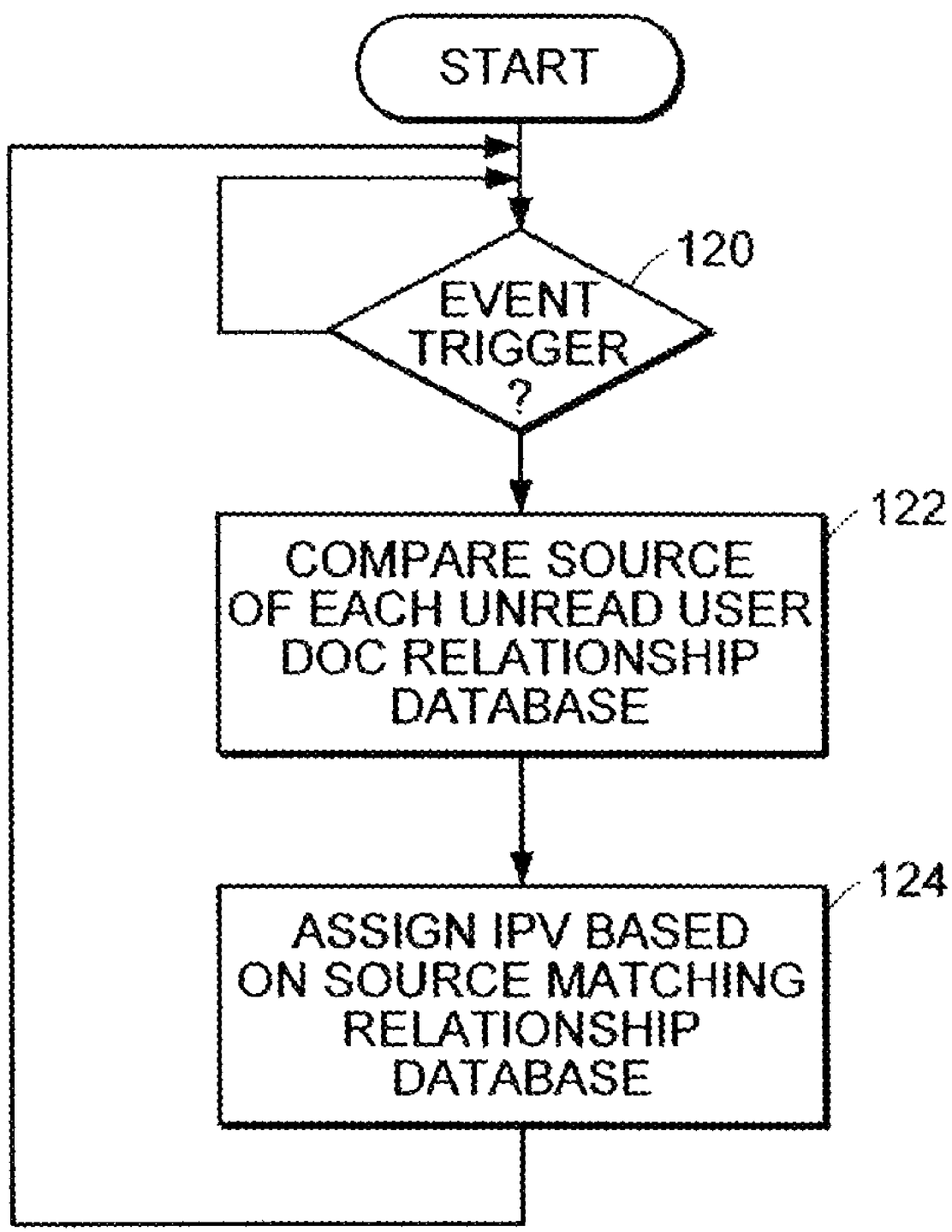
FIG. 6 is a flow diagram illustrating an exemplary process by which object interest priority values may be set using the system of FIG. 3.

Referring now to FIG. 6, a flow diagram is provided for illustrating the steps taken in assigning an IPV based on the relationship database contents. At step 120, an event triggers the update of the IPV. At step 122, the meta data for each document that identifies the source of the document is compared against the individuals in a users' relationship database. The user may prioritize the individuals, such that certain individuals will obtain a higher 'unread' attribute based on relationship than other individuals. At step 124, IPVs are then assigned to the user documents based on the relationship attributes.

Figure 7:
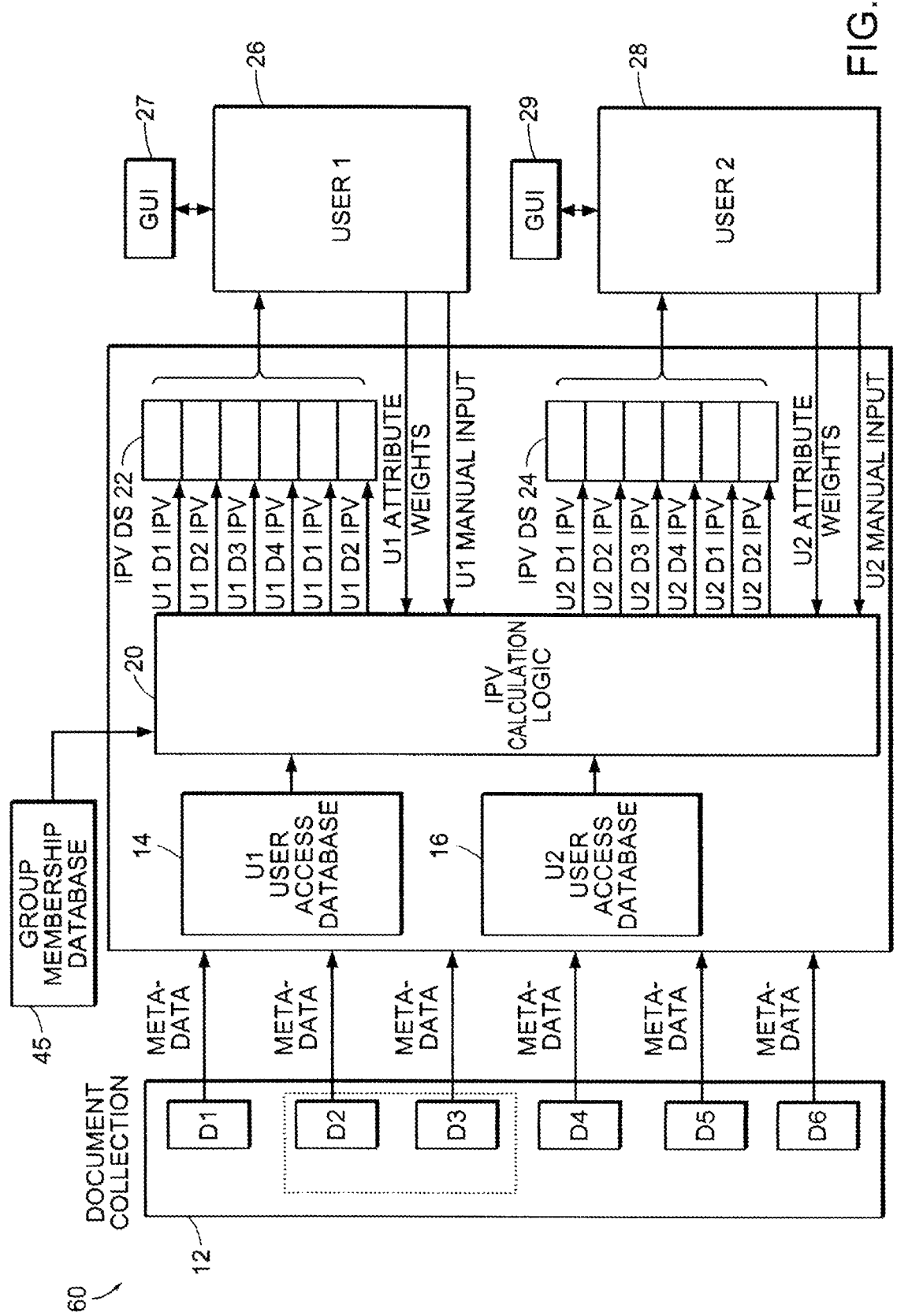
FIG. 7 illustrates a second embodiment of an object interest indication system of the present invention, wherein object interest is determined according to inter-object similarity.

Referring now to FIG. 7, a fourth embodiment of an interest identification system is shown to include a group membership database. The group membership database stores, for a set of one or more documents, the identity of individuals in a group who have access to the documents. In many working environments, teams of users share access to and responsibility for a common set of documents. For example, documents D2 and D3, illustrated in dashed lines, may form a set of documents that is accessed by a common group. When the set of documents is large, it may not be necessary for each member of the group to read every single document, rather it is merely important that the knowledge exists within the group. Thus, the present invention includes a Social Filtering—shared responsibility (Ss) attribute, which is calculated using the group membership database 45. The Ss attribute indicates how many other members in a user's group have read a given document. If many members of the group have read the document, the document is less unread to the particular user.

In some embodiments, the group membership database may be an organizational chart, where certain members in different 'leaves' of the chart are defined to be 'teams' in the group. In such an embodiment, the data from the group membership database may also be used to define a Social Filtering—unique responsibility (Su) attribute. The Su attribute is calculated by evaluating the group database differently; rather than look at 'teams' the database is scanned to identify clients and managers of the user. Any document that is shared by a client or a manager of the user, and that has been read by the client or manager, is more 'unread' to the individual user. Thus, this attribute is used to enable the user to ensure that their knowledge base is consistent with superiors and clients, to enable them to answer questions when uniquely called upon.

Figure 8:
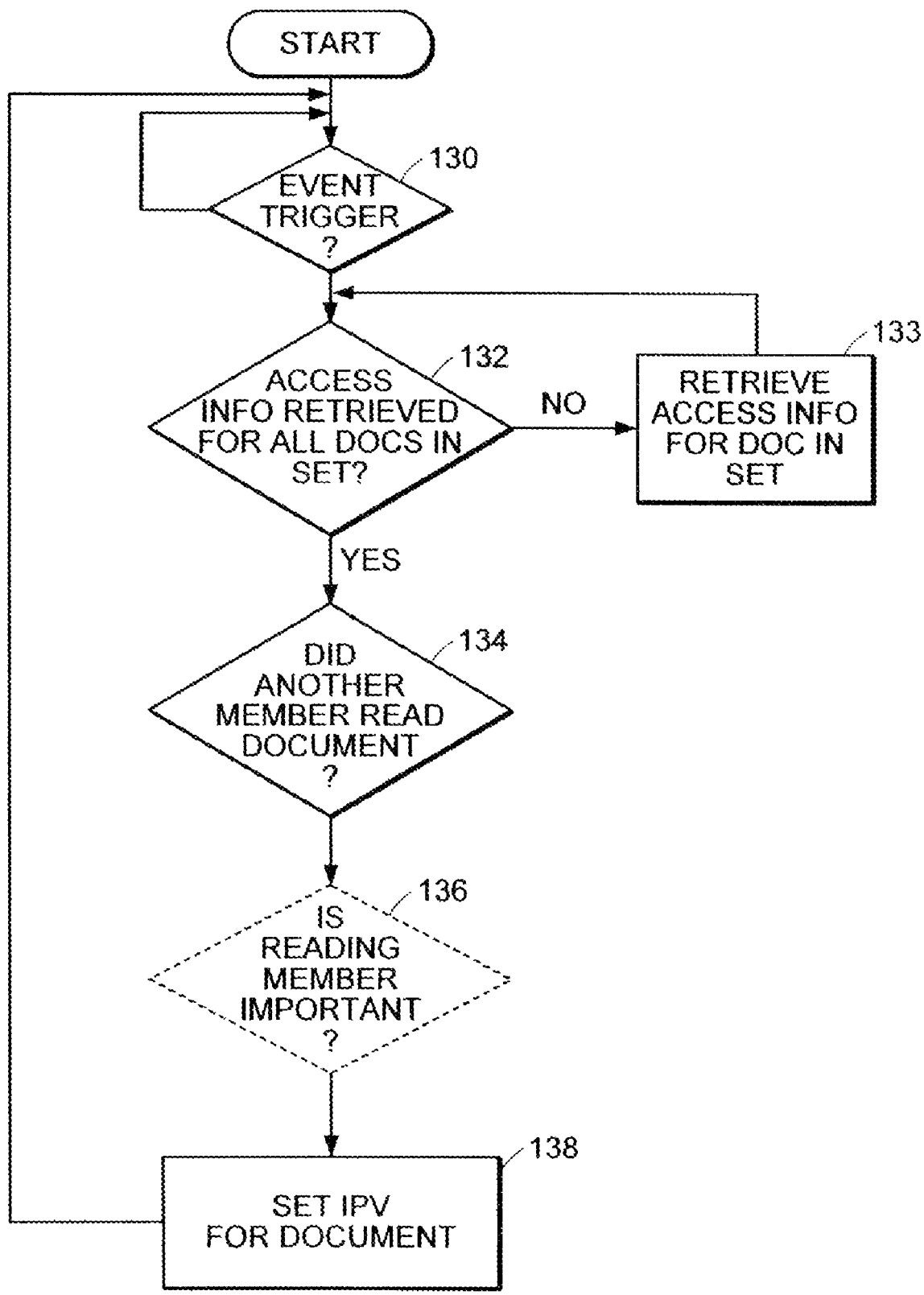
FIG. 8 is a flow diagram illustrating an exemplary process by which object interest priority values may be set using the system of FIG. 3.

Referring now to FIG. 8, a flow diagram is provided for illustrating a method used to calculate IPV using the group information 30. At step 130, the trigger event causes IPV calculation to begin. At step 132, the access information is retrieved for each document in the set of documents being accessed by the user. The access information identifies the documents in the set have been read by the members in the group. At step 134, it is determined how many other members have read the document. Depending upon the number of members that have read the document, the Ss attribute will vary from more unread to less unread. In an alternate embodiment, at step 136 it is determined whether the person that has read the document is important to the user (i.e., a superior, or client, etc). Depending upon the responses to the questions, the IPV is set accordingly.

Thus, a number of embodiments have been shown where a variety of attributes are used to set the IPV values for given documents. According to another embodiment, the IPV value may be directly set by a third party, such as a superior who wishes the user to learn the contents of the document. In such an embodiment, the attribute is referred to as the Leadership attribute (L) and may be set through the manual input path 26 directly by a user's superior (in the figures represented as User 2).

Figure 9:
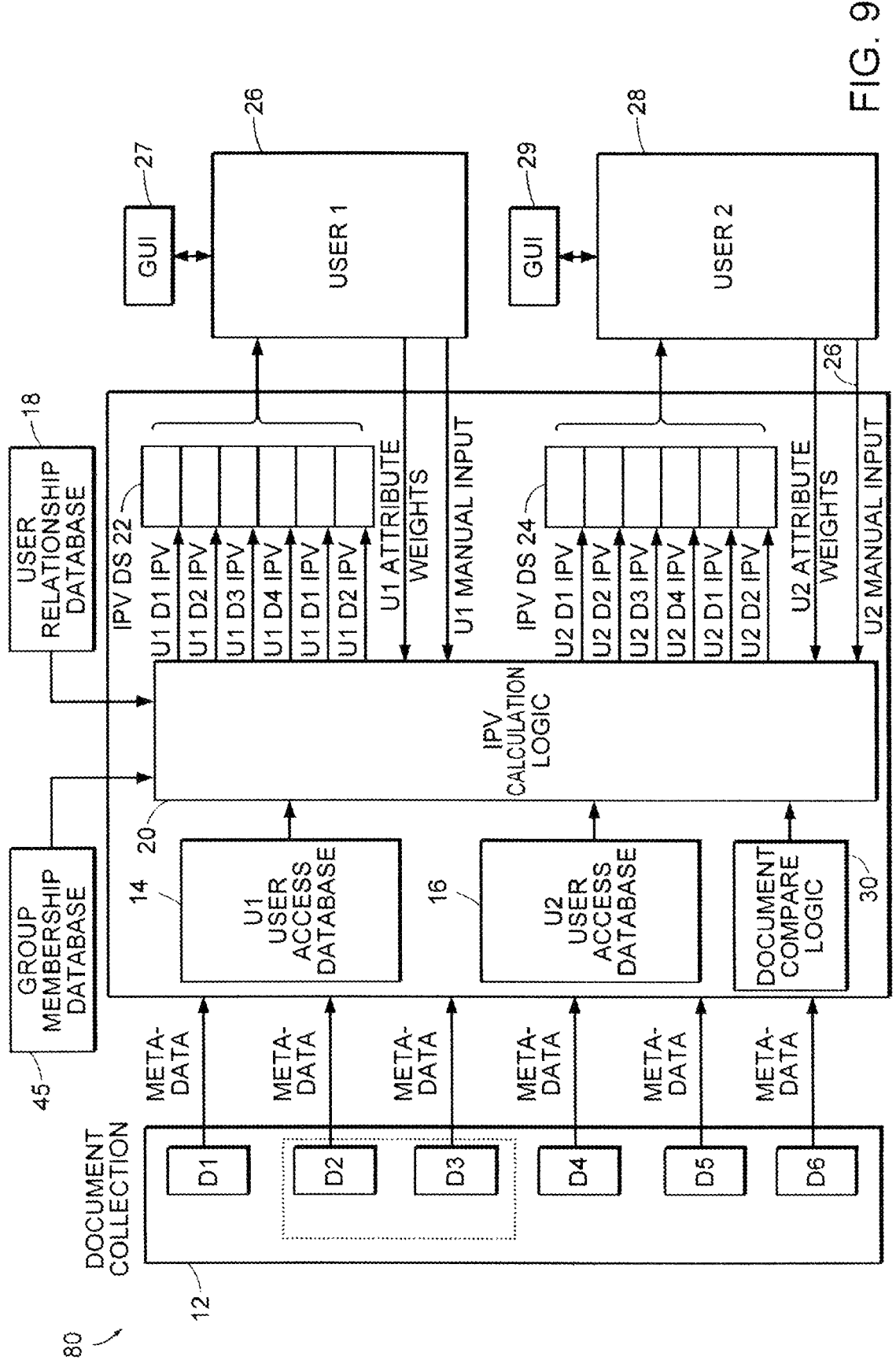
FIG. 9 illustrates an embodiment of the present invention that incorporates features described in FIGS. 1, 3, 5 and 7 above.

Although the embodiments have been shown separately, it should be understood that any combination of the attributes may be used by a user in controlling document access. For example, referring briefly to FIG. 9, an embodiment of the interest indication system 80 is shown including user access databases 14 and 16, group membership database 45, user relationship database 18, and document compare logic 30. In one implementation of the embodiment of FIG. 9, the IPV may be calculated using below equation I:

$$IPV = A + C + E + eC\_R + Ss + Su + L \quad \text{Equation I:}$$

Where A is the Available Time attribute
C is the Collection match attribute
E is the Elapsed Time attribute
eC is the Ego-centric collection math attribute
R is the Relationship attribute
Ss is the Social-filtering-shared attribute
Su is the Social filtering-unique attribute
L is the Leadership attribute It should be noted that the equation I may be modified such that the attributes are weighted, with the individual weights of each attribute being specifiable by the user. In one embodiment, this specification is performed programmatically. In a second embodiment, this specification is made through simple controls in a graphical user interface. In this manner, a particular user can give higher priority to Relationship data than other users. Equation II below illustrates the modification of Equation I to include weights.

$$\text{IPV} = A*W_A + C*W_C + E*W_E + eC*W_{eC} + R*W_R + Ss*W_{Ss} + Su*W_{Su} + L*W_L \quad \text{Equation II:}$$

Thus, a variety of methods and apparatus' have been shown and described for assigning Interest Priority Values (IPVs) to user documents. According to another aspect of the present invention, the IPVs may be used to visually represent the attractiveness of the document to a particular user by translating the IPV value into varying ranges of visual attributes. The visual attribute may be used to indicate a total IPV, or alternatively may include features representing each of the IPV attributes. One exemplary embodiment of a visualization icon that may be used to surround a document name, or alternatively a cluster of documents, will now be shown and described with regard to FIGS. 10A-10D. However, it should be understood that the present invention is not limited to the particular visualization shown in FIGS. 10A-10D. Rather, any visual representation that uses the one or more attributes to differentiate document interest to a particular user is equally applicable to the present invention.

Figure 10A:
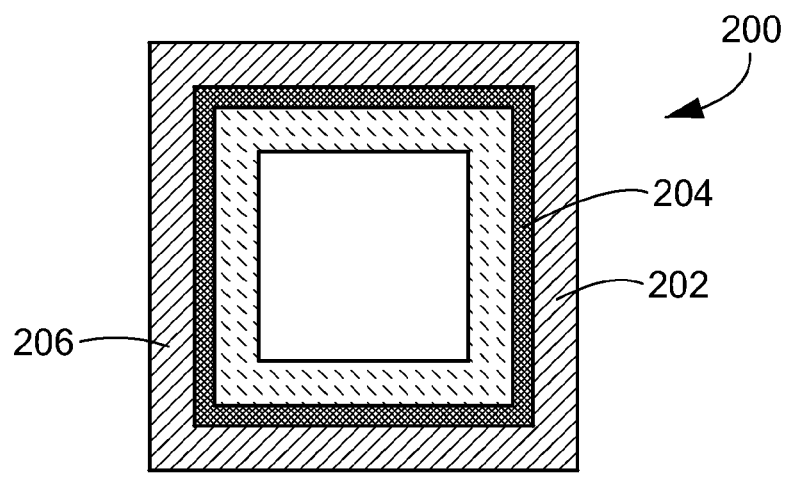
FIGS. 10A-10D illustrate several exemplary visualizations that may be used to represent the different interest priority factors described with reference to FIGS. 1-9.

Referring now to FIG. 10A, an icon 200 is shown to include a first bordered area 202 and a second bordered area 204. The first bordered area may be used to visually represent the overall 'unreadness,' or IPV value. The second border may be used to indicate the Relatedness of the document. The representations of the values of the various attributes that go into calculating the IPV may be represented in a variety of ways. For example, the overall value of the IPV may be indicated by varying the width of the border 202 of the icon. Thus, the document associated with icon 210, which has a relatively wide width, is more unread than document associated with icon 216. If the Availability (A) attribute is used for IPV calculation, in FIG. 1, the document associated with icon 210 is 'older' than the document 216.

Figure 10B:
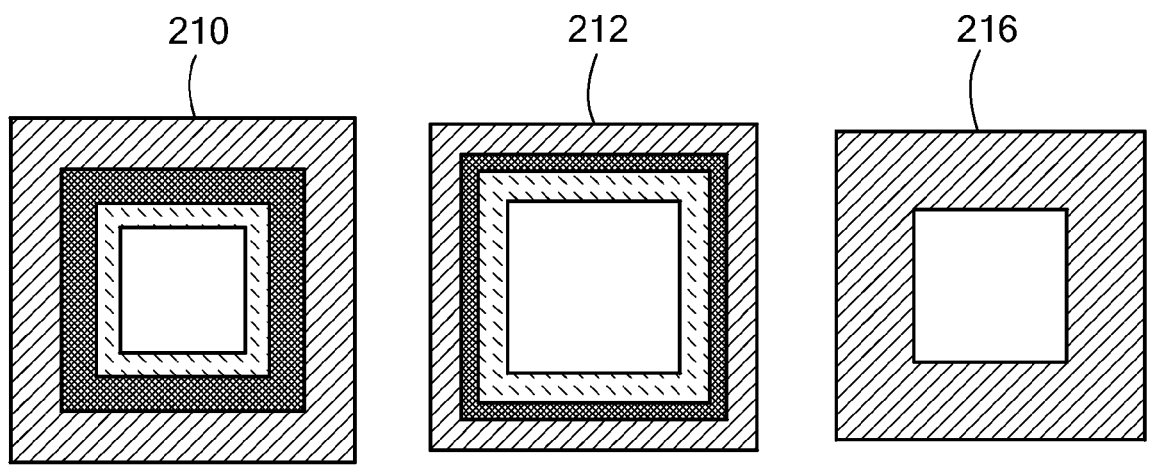

In one embodiment, and icon may include different features for each different IPV attribute. For example, in the icons of FIG. 2, the value of the Relatedness attribute is indicated by internal border 204. In icon 200, the Relatedness border extends partially around the icon, but does not extend into space 206, thus indicating to a user that the document associated with the icon is sourced by an author that the user is interested in. In FIG. 10B, is can be seen that neither document 210 or 216 are sourced by an author that is identified as Related to the user. However, document 212 does show an indication of Relatedness.

Figure 10C:
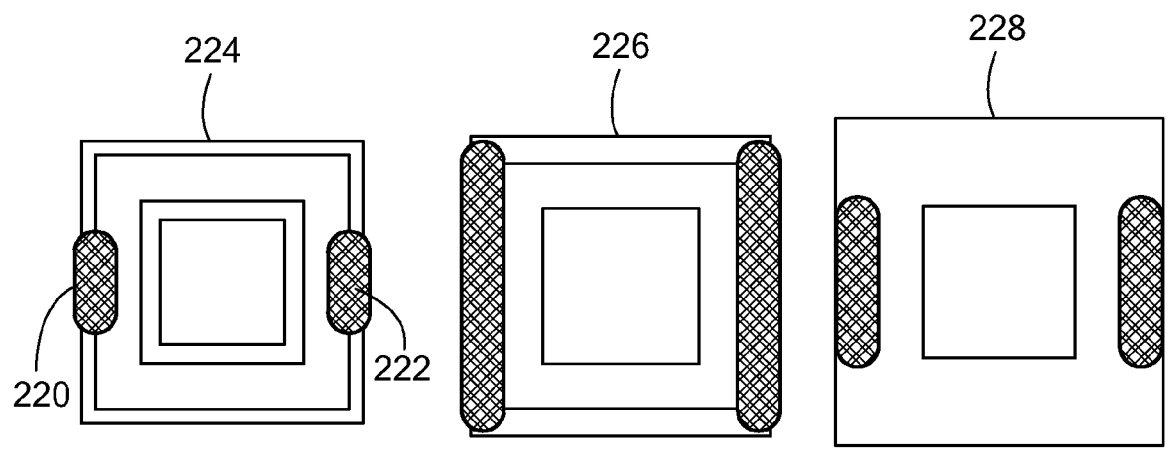
Figure 10D:
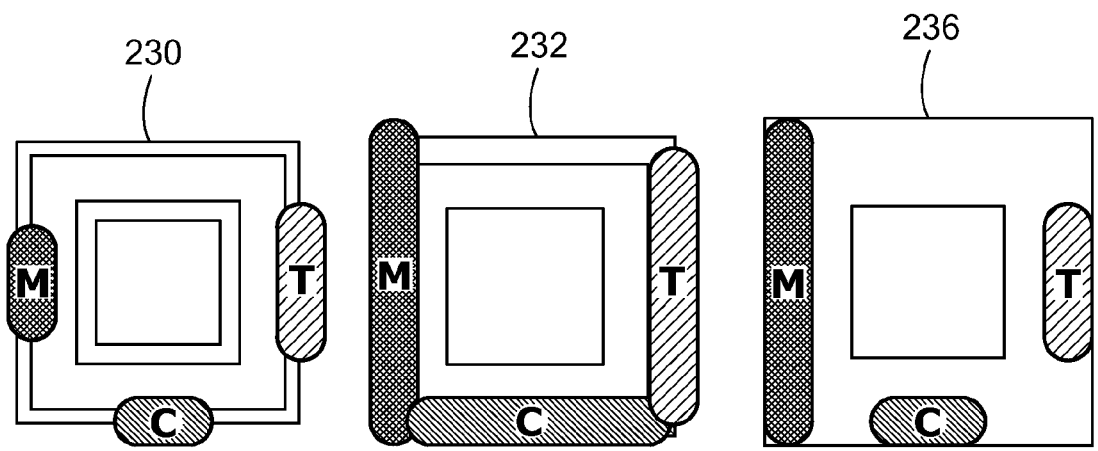

Referring now to FIGS. 10C and 10D, it may be important to known if others have read a document that the user has not read (i.e., one of the Social Filtering attributes). In FIG. 10C, additional visual features are added to the icon to represent the Social Filtering attributes. For example, the exterior border is used to indicate the Available Time attribute for the user. Bars 220 and 222 may be added to the icon to represent which document has been read by others. Thus, the document associated with icon 226 has received more attention than the document associated with icons 224 and 228.

FIG. 10D illustrates an embodiment of an icon that may be used to represent social filtering attributes of a variety of different groups. For example, each group could be represented by a differently positioned (or colored) bar on the icon. In the embodiment of FIG. 10D, three groups, group M (management), C (clients) and T (team) are shown. Each group has accessed each different document 230, 232 and 236 in different amounts. The document associated with icon 236 has been read by some clients, a portion of the team, and most management. The document associated with icon 232 has been read by nearly all of the managers, clients and team members. The visual bars assist the user in identifying that the document 236, which seems to have garnered a large interest, is a document that should be given priority.

Accordingly, FIGS. 10A-10D have illustrated several methods of representing the various document attributes to a user in a visual manner that assist the user in prioritizing the reading of the documents. However, the present invention is not limited to the particular icon or arrangement of visual features shown in the figures. Rather, the present invention may be used to drive visual feature representation in a variety of manners to indicate document attributes to a user, and thereby simplify a user document selection process.

As mentioned above, the embodiments described herein have used the concepts of "documents" and "readness" for exemplary purposes. The present invention may also be used with other types of objects (thus replacing the concept of "documents"), such as modules of program code, images, multimedia clips, database records, and yet other types of sharable objects. The present invention may correspondingly be used with other types of access experience with those objects (thus replacing the concept of "readness"), such as familiarity, "viewedness," "heardness," review, or yet other types of experience.

Accordingly, a method and apparatus has been shown and described for simplifying user document access by determining and representing document attributes to the user. The method and apparatus has been shown and described with regard to several figures, some of which include functional blocks which are shown for exemplary purposes only. FIGS. 2, 4, 6 and 8 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

The invention claimed is:

1. A data structure stored on a computer-readable storage media in a computer processing system, the data structure including:
an entry for each object in a collection of objects, each entry storing an interest priority value for each associated object in the collection responsive to at least one attribute of the associated object, wherein each interest priority value indicates a relative importance of the corresponding object to an accessing individual compared to other objects in the collection, wherein the interest priority value of a given object in the collection to the accessing individual is calculated by the computer processing system based on
similarity of the given object to other objects in the collection previously accessed by the accessing individual, such that the interest priority value of the given object is automatically decreased as the similarity of the given object to other objects in the collection previously read by the accessing individual increases,
the number of other individuals in a group to which the accessing individual belongs that have accessed the given object, such that the interest priority value of the given object is automatically decreased as the number of other individuals in the group that have accessed the given object increases, wherein membership in the group to which the accessing individual belongs is automatically determined from a group membership database, and
the number of individuals in a group to which the accessing individual does not belong that have accessed the given object, such that the interest priority value of the given object is automatically increased as the number of individuals in the group to which the accessing individual does not belong that have read the given object increases, wherein membership in the group to which the accessing individual does not belong is automatically determined from the group membership database.

2. The data structure according to claim 1, wherein the at least one attribute is a temporal attribute of the object.

3. The data structure of claim 2, wherein the collection of objects includes both accessed and unaccessed objects, and the temporal attribute is associated with an unaccessed object and indicates an elapsed time since the unaccessed object joined the collection.

4. The data structure of claim 2, wherein the collection of objects includes both accessed and unaccessed objects, and the temporal attribute is associated with an accessed object and indicates an elapsed period of time since the accessed object was accessed by the accessing individual.

5. The data structure according to claim 1, wherein the at least one attribute is a similarity attribute of the object.

6. The data structure according to claim 5, wherein the collection of objects includes both accessed and unaccessed objects, and wherein the similarity attribute is associated with an unaccessed object for indicating a similarity between the unaccessed object and other objects in the collection.

7. The data structure according to claim 5, wherein the collection of objects includes both accessed and unaccessed objects, and wherein the similarity attribute is associated with an unaccessed object for indicating a similarity between the unaccessed object and other accessed objects in the collection.

8. The data structure according to claim 1, wherein the at least one attribute is a source attribute of the object.

9. The data structure of claim 8, wherein the collection of objects includes accessed and unaccessed comments, and wherein the source attribute is associated with an unaccessed object and indicates an importance of a source of the unaccessed object.

10. The data structure of claim 9, where the source is an identifier of an author of the unaccessed object.

11. The data structure of claim 9, wherein the source is an identifier of a person who added the object to the collection.

12. The data structure of claim 1, wherein the accessing individual is a member of a group of accessing individuals, and the at least one attribute is a group attribute of the object.

13. The data structure of claim 12, wherein the group attribute indicates how many members of the group other than the accessing individual have accessed the associated object.

14. The data structure of claim 12, wherein associated with each member of the group attribute is an identity attribute, and wherein the group attribute indicates whether members of the group having predetermined identity attributes have accessed the associated object.

15. An apparatus for calculating an interest priority value for at least one object in a collection of objects accessed by a user comprising:
a memory;
an attribute database for storing attribute information for each object in the collection; and
interest priority calculation logic, coupled to the database, for assigning an interest priority value to the at least one object in response data in the attribute database for all of the objects in the collection, wherein the interest priority value of a given object in the collection to an accessing individual is calculated based on
similarity of the given object to other objects in the collection previously accessed by the accessing individual, such that the interest priority value of the given object is automatically decreased as the similarity of the given object to other objects in the collection previously accessed by the accessing individual increases, and
the number of other individuals in a group to which the accessing individual belongs that have accessed the given object, such that the interest priority value of the given object is automatically decreased as the number of other individuals in the group that have accessed the given object increases, wherein membership in the group to which the accessing individual belongs is automatically determined from a group membership database, and
the number of individuals in a group to which the accessing individual does not belong that have accessed the given object, such that the interest priority value of the given object is automatically increased as the number of individuals in the group to which the accessing individual does not belong that have read the given object increases, wherein membership in the group to which the accessing individual does not belong is automatically determined from the group membership database.

16. The apparatus of claim 15, wherein the attribute database is a user access database for storing an access indicator for each object in the collection, the access indicator for indicting whether the associated object has been accessed by the user, and a time stamp indicating a time that the object was accessed by the user.

17. The apparatus of claim 16, wherein the collection of objects includes accessed and unaccessed objects, and wherein the interest priority calculation logic assigns the interest priority value for a given object in response to the time stamp values of all of the unaccessed objects of the collection.

18. The apparatus of claim 16, wherein the collection of objects includes accessed and unaccessed objects, and wherein the interest priority calculation logic assigns the interest priority value for a given object in response to the time stamp of a given accessed object exceeding a predetermined age threshold.

19. The apparatus of claim 15, wherein the attribute database is a similarity database, including a similarity indicator for each object indicating how similar the object is to other objects in the collection.

20. The apparatus of claim 19, wherein the collection includes accessed and unaccessed objects, and wherein the similarity indicator indicates how similar a given unaccessed object is other objects in the collection.

21. The apparatus of claim 19, wherein the collection includes accessed and unaccessed objects, and wherein the similarity indicator indicates how similar a given unaccessed object is to other accessed objects in the collection.

22. The apparatus of claim 15, wherein the attribute database is a relationship database, including an identifier of at least one individual that is important to the user.

23. The apparatus of claim 22, wherein the interest priority value is assigned to each object responsive to the associated object being sourced by the at least one individual identified in the relationship database.

24. The apparatus of claim 15, wherein the attribute database is a group database including an entry for at least one set of objects in the collection, the entry identifying members of a group having access to the at least one set.

25. The apparatus of claim 24, wherein the interest priority value of a given object in the at least one set of objects is assigned in response to which members have accessed the objects in the set.

26. The apparatus of claim 25, wherein the user is a member of the group having access to the at least one set, and wherein the interest priority value for the given object for the user is set in response to whether members other than the user have accessed the given object.

27. An apparatus for indicating that at least one object in a collection of objects is of interest to a user includes:
a memory;
an attribute database, for storing attribute information for each object in the collection;
interest priority calculation logic, coupled to the database, for assigning an interest priority value to the at least one object in response to data in the attribute database for all of the objects in the collection, wherein the interest priority value of a given object in the collection to the accessing individual is calculated by the interest priority calculation logic based on
similarity of the given object to other objects in the collection previously accessed by the accessing individual, such that the interest priority value of the given object is automatically decreased as the similarity of the given object to other objects in the collection previously accessed by the accessing individual increases, and
the number of other individuals in a group to which the accessing user belongs that have accessed the given object, such that the interest priority value of the given object is automatically decreased as the number of other individuals in the group that have accessed the given object increases, wherein membership in the group to which the accessing individual belongs is automatically determined from a group membership database, and
the number of individuals in a group to which the accessing individual does not belong that have accessed the given object, such that the interest priority value of the given object is automatically increased as the number of individuals in the group to which the accessing individual does not belong that have read the given object increases, wherein membership in the group to which the accessing individual does not belong is automatically determined from the group membership database; and
a display, coupled to the interest priority calculation logic, for providing an icon associated with one or more of the objects in the collection, and having a visual feature that is represented according to the interest priority value of the one or more objects.

28. The apparatus of claim 27, wherein the attribute database stores different attribute information for each of the objects in the collection, and wherein the icon includes a visual feature for representing a value of each attribute information for the object.

29. The apparatus of claim 27, wherein the attribute information stored for each object is a temporal attribute of the each object.

30. The apparatus of claim 27, wherein the attribute information is a list of object sources of interest.

31. The apparatus of claim 27, wherein the attribute information stored for each object identifies members of a group having access to each object.

* * * * *